United States Patent [19]

Taguchi et al.

[11] Patent Number: 4,534,992
[45] Date of Patent: Aug. 13, 1985

[54] PROCESS FOR THE PRODUCTION OF SOYA PROTEIN FLAKES

[75] Inventors: Gyota Taguchi; Toshiji Sato, both of Kanagawa, Japan

[73] Assignee: Nisshin Oil Mills, Ltd., Japan

[21] Appl. No.: 568,593

[22] Filed: Jan. 6, 1984

[30] Foreign Application Priority Data

Jan. 10, 1983 [JP] Japan ................................. 58-1220

[51] Int. Cl.$^3$ ............................................. A23J 3/00
[52] U.S. Cl. .................................... 426/656; 426/457; 426/459; 426/516; 426/517; 426/802
[58] Field of Search .............. 426/104, 656, 516, 517, 426/802, 457, 459

[56] References Cited

U.S. PATENT DOCUMENTS

| | | | |
|---|---|---|---|
| 3,870,805 | 3/1975 | Hayes et al. | 426/802 X |
| 4,171,668 | 10/1979 | Ratcliffe | 426/516 X |
| 4,293,575 | 10/1981 | Cockram et al. | 426/802 X |

*Primary Examiner*—Robert Yoncoskie
*Attorney, Agent, or Firm*—Kane, Dalsimer, Kane, Sullivan & Kurucz

[57] ABSTRACT

Disclosure is made of a process for the production of soya protein flakes having similar structure and taste to fish flakes of tuna and the like, comprising soya protein-water mixture to an extrusion process under heat and pressure by using an extruder having at least first and second dies each having at least one opening, the distance between the dies being 2–6 mm, the gap between rims of nearest openings of the dies being greater than or equal to the cross-sectional diameter of the opening of the first die.

3 Claims, 2 Drawing Figures

PROCESS FOR THE PRODUCTION OF SOYA PROTEIN FLAKES

FIELD OF THE INVENTION

The present invention relates to soya protein foods which have similar structure and taste to fish flakes such as tuna, bonito, mackerel and the like.

BACKGROUND OF THE INVENTION

Heretofore canned foods of fish flakes have been produced by way of boiling fish such as tuna, bonito and mackerel, removing the head, tail, viscera, bloody colored flesh and skin portions therefrom, crushing the remaining edible portions to obtain flakes, seasoning them and if desired adding edible oil thereto. The yield of those raw fish to be used, however, tend to be up and down based on variable conditions concerning ocean currents, weather and the like. In addition, the reduction in yields and sudden rise in prices of the raw fish such as tuna and bonito have resulted from the current legislation in many countries for laying claim to their 200 miles territorial waters. Accordingly, the manufacturers of the canned foods of fish flakes recently find it difficult to obtain those raw fish in a stabilized amount and price. In this situation, new merits of vegetable proteins were discovered in their usage in place of fish flakes and revaluated in agreement with consumer's preference for healthy foods.

Vegetable proteins, in particular the granulated soya protein prepared by extrusion process, have meat-like structure and taste. When the extruding conditions are chosen, the layered soya protein may be obtained and available for the preparation of soya protein flakes by means of a suitable apparatus. However, thus prepared soya protein flakes are utterly different in their structure and taste from the fish flakes. Therefore, this sort of soya protein flakes cannot substitute for the fish flakes.

U.S. Pat. No. 3,870,805 discloses a method for producing soya proteins having similar taste to chicken, clam, lobster or the like by using a couple of dies standing abreast. The couple of dies enables the formation of fibrous structure of the protein which has muscular taste stronger than the protein extrudate by means of a single die. The thus obtained muscular taste can remain even after the fibrous protein is subjected to retort heating at 240° F. for 30 min. However, this soya protein having muscular taste is far different in its structure and taste from the fish flakes and can hardly substitute therefor.

SUMMARY OF THE INVENTION

It is one object of the present invention to provide a process for the production of soya protein flakes consisted mainly of soya protein.

It is another object of the present invention to provide a process for the production of soya protein flakes which have similar structure and taste to fish flakes.

These objects of the present invention may be accomplished by a process for the production of soya protein flakes comprising admixing raw materials including as a chief ingredient soya protein with water and subjecting the mixture to an extrusion process under heat and pressure by using an extruder having at least first and second dies each having at least one opening and standing perpendicularly to the direction of extrusion at interval of 2-6 mm of the faces thereof, the gap between a rim of one opening of the first die and a rim of one opening of the second die nearest said opening of the first die being greater than or equal to the cross-sectional diameter of said opening of the first die, thereby enabling the formation of flakes having sponge-like structure and folded parallel to said die faces between the first and second dies.

The first die preferably has at least one opening in the central portion thereof and the second die preferably has at least two openings in the periphery thereof.

DETAILED DESCRIPTION OF THE INVENTION

The chief ingredient of the raw materials as used in the production of soya protein flakes according to the present invention is soya protein which may be in the form of defatted soybean, condensed soya protein, isolated soya protein or the mixture thereof. The subsidiary ingredients of the raw materials to be used are, by way of example, colorants, pH adjusting agents, seasonings, wheat gluten, flour, various starch, corn powder and the like.

The type and major constituents other than dies of the extruder to be used in accordance with the present invention may be the same as those of the conventional food extruders commercially available.

Figure 1:
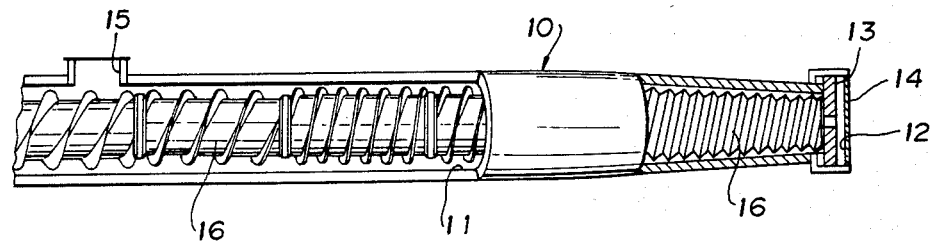
FIG. 1 of the drawings shows a longitudinal cross-sectional view of one structural embodiment of extruders to be used in the process according to the present invention.
Figure 2:
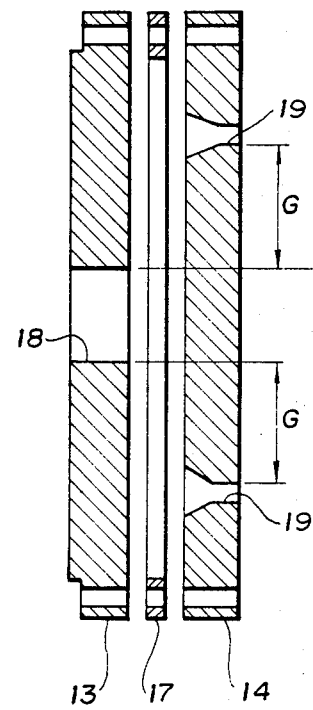
FIG. 2 shows an enlarged cross-sectional view of the dies constituting the extruder shown in FIG. 1.

The extruder as shown in FIGS. 1 and 2 of the drawings comprises a cylindrical extruder barrel 10 housing first and second confining zones 11 and 12 confined by the barrel 10 and first and second dies 13 and 14. The first confining zone 11 is equipped with a screw conveyor 16. The mixture of chief and subsidiary ingredients of raw materials and water is usually fed via feeding inlet port 15 to the extruder barrel 10 and forced along the direction of extrusion through the barrel 10. Suitable heating means such as a heating jacket (not shown in the drawings) is provided on the exterior of the barrel 10 so as to heat and consequently fluidize the mixture as fed to the barrel.

In the embodiment as shown in FIGS. 1 and 2, the first and second dies 13 and 14 have a disk shape and are spaced apart from each other at interval of 2-6 mm by means of an annular spacer 17 intervening therebetween so as to confine the second confining zone 12.

The first die 13 has an opening 18 having a relatively large cross-sectional diameter in the central portion thereof, while the second die 14 has a plurality of openings 19 of relatively small cross-sectional diameter in the periphery thereof. There is a gap G between the openings 18 and 19, which is greater in length than the cross-sectional diameter of the opening 18.

In the present invention, the arrangement of the openings in the first and second dies need not be limited to that of the embodiment as shown in FIGS. 1 and 2. These openings may have any arrangement on condition that the gap between a rim of one opening of the first die and a rim of the opening of the second die nearest to said one opening of the first die is greater than or equal to the cross-sectional diameter of said opening of the first die.

In addition, the first and second dies may have any number of openings. The total of the cross-sectional area of the openings of the first die ($A_1$) preferably is approximately the same as that of the openings of the second die ($A_2$). That is to say, the ratio of $A_1/A_2$ is preferably $1/0.7 \sim 1.3$, more preferably $1/0.9 \sim 1.1$.

When the raw materials including soya protein as a chief ingredient and admixed with water are introduced into the extruder barrel, they are forced inward by the screw conveyor and pressurized and heated to be fluidized when they arrive in the end portion of the screw conveyor. The thus fluidized raw materials are extruded through the opening of the first die toward the second die. When the distance of the faces of the first and second dies is determined to be 2-6 mm, preferably 3-5 mm, the fluidized raw materials extruded in the second confining zone are spread thinly and change into a semi-fluidized state. The mass of the semi-fluidized raw materials thus transported from the highly pressurized first confining zone to the intermediately pressurized (higher than the atmospheric pressure) second confining zone forms a sponge-like structure by the generation of very little foams caused by the expansion of water and air brought by the fluidized raw materials. In this way, the sponge-like flakes are formed in the second confining zone. If the distance of the faces of the first and second dies is less than 2 mm, the fluidized raw materials become difficult to extrude through the opening of the first die toward the second die. If the distance is more than 6 mm, the resulting flakes become too thick and contains too enlarged foams.

In order to make sure that the entire formation of the sponge-like flakes is spread thinly in the second confining zone, it is necessary to set the gap G between the rims of one of the openings of the first die and one of the openings of the second die nearest to said opening of the first die to be greater than or equal to the cross-sectional diameter of said opening of the first die. When the gap G is less in length than the cross-sectional diameter of said opening of the first die, the formation of flakes provided with enough sufficient foams can not occur before the flakes are extruded through the openings of the second die. Moreover, the foams become too large to form the flake structure. When the openings of the first and second dies are aligned, the mass of the raw materials are to be extruded directly through the opening of the second die and consequently obtain relatively large foams. The upper limit of the gap may be inevitably determined from the diameter of the dies.

Due to the structure of dies as described hereinbefore, the raw materials are passed through the opening of the first die, are spread thinly to form flakes in the second confining zone and are folded and expanded in the direction of extrusion when they pass through the opening of the second die. The thickness of the flakes thus formed is consequently less than the distance of the two dies and the structure thereof is arranged in the direction of extrusion. The foams of the flakes as formed previous to the extrusion through the second die can be kept little because of their semifluidized state and should not enlarge even when the flakes are extruded into atmospheric pressure. The thus formed foams of the flakes may be much lesser than those formed by the single-die extrusion for the production of the granular soya protein having meat-like structure and taste.

The extrudate thus obtained is cut into 1-2 cm length and crushed to be easily collapsed to give thin slender flakes of soya protein.

In accordance with the present invention, soya protein flakes consisting mostly of soya protein can advantageously be obtained.

Since soybeans are readily obtainable in large quantities, the flakes can be mass-produced in accordance with the present invention may be substituted for fish flakes which are becoming hard to obtain because of their low yields and high prices and may fully meet the customer's requirements.

EXAMPLE 1

To 18 parts by weight of water was admixed 100 parts of the mixture of 400 kg of defatted soybean meals and 100 kg of condensed soya protein washed with alcohol. The thus obtained protein-water mixture was subjected to extrusion using the extruder having the dies under the operational conditions as mentioned below. The thus obtained extrudate was cut into 1.5 cm length and crushed to yield 450 kg of soya protein flakes. These flakes when rehydrated had similar structure and taste to that of the flakes of yellowfin tuna sold under the name of light-meat.

30 parts by weight of the thus rehydrated soya protein flakes and 70 parts by weight of the light-meat were admixed and placed in Size No. 6 can and then 40 parts by weight of extract of vegetables was poured thereinto. The can was wound up and closed and the same was subjected to retort heating at the temperature of 115° C. at the central portion thereof for 7 minutes to give canned tuna flakes containing soya protein. This flakes has similar flavor and taste as well as outward appearance to that of tuna flakes.

(1) Die Structure
  First Die:
    Diameter: 160 mm
    Opening:
      Number: 1
      Diameter: 25 mm
      Location: Central portion of the die
  Distance of the dies: 5 mm
  Second Die:
    Diameter: 160 mm
    Openings:
      Number: 24
      Diameter: 5 mm
      Location: Periphery of the die
  Gap G: 30 mm
(2) Operational Conditions:
  Rate of disposition of raw materials: 110 kg/h
  Temperature of extruder: 128° C. (preceding to die)

EXAMPLE 2

To 100 parts by weight of a mixture of 475 kg of defatted soybean flour, 25 kg of isolated soya protein and 50 kg of strong flour was successively admixed 20 parts by weight of water. Thus obtained mixture was subjected to the extrusion process by using the dies having the structural feature (1) as mentioned below under the operational conditions (2) as mentioned below, cut into pieces having the length of 2 cm, crushed and dried to give 490 kg of flake-like soya protein. When rehydrated, the thus obtained flakes have similar structure and taste to that of flakes of long-fin tuna sold under the name of white-tuna.

Thereafter, 25 parts by weight of the rehydrated flakes of soya protein was admixed with 75 parts by weight of whitemeat and the resulting mixture was placed in Size No. 6 can accompanied with 25 parts by weight of vegetable extract and 30 parts by weight of cotton-seed-salad oil. The can was then wound up and closed and the same was subjected to retort heating at the temperature of 115° C. at the center portion thereof for 7 minutes to give canned tuna flakes containing soya protein flakes in oil. The thus obtained meal has similar structure and taste to that of the tuna flakes.

(1) Die Structure:
   First Die:
      Diameter: 160 mm
      Opening:
         Number: 1
         Diameter: 25 mm
         Location: Central portion of the die
   Distance of the dies: 4.5 mm
   Second Die:
      Diameter: 160 mm
      Openings:
         Number: 18
         Diameter: 6 mm
         Location: Peripheral portion of the die
   Gap G: 43 mm (2) Operational Conditions:
   Rate of disposition of the raw materials: 105 kg/h
   Temperature of extruder: 135° C. (preceding to die)

EXAMPLES 3-8

The soya protein flakes were prepared in the same manner as in Example 1, with the exception that the die structure was changed to those as shown in Table and the following operational conditions were taken.

Operational Conditions:

Rate of disposition of the raw materials: 100~110 kg/h

Temperature of the Extruder: 125°~135° C. (preceding to die)

TABLE

| Example No. | Diameter of dies | Distance of dies | Diameter of the opening of the first die | Gap G | State of extrudates |
|---|---|---|---|---|---|
| 3 | 160 m/mφ | 6 m/m | 25 m/mφ | 30 m/m | structure like fish flakes |
| 4 | 160 m/mφ | 4.5 | " | 43 | structure like fish flakes |
| 5 | 160 m/mφ | 5 | " | 20 | large foams not forming flakes |
| 6 | 160 m/mφ | 7 | " | 30 | bulky flakes |
| 7 | 160 m/mφ | 1 | " | 30 | extruded imperfectly |
| 8 | 160 m/mφ | 2 | " | 30 | structure like fish flakes |

What we claim are:

1. A process for the production of soya protein flakes comprising admixing raw materials including as a chief ingredient soya protein with water and subjecting the mixture to an extrusion process under heat and pressure by using an extruder having at least a first and second die each having at least one opening and situated perpendicular to the direction of extrusion with an interval of 2-6 mm between the faces of said dies, the distance between a rim of one opening of the first die and the nearest rim of one opening of the second die being greater than or equal to the cross-sectional diameter of said opening of the first die, thereby enabling the formation of flakes having a sponge-like structure and folded parallel to said die faces between the first and second dies.

2. A process as claimed in claim 1, wherein said first die has at least one opening provided in the central portion thereof and wherein said second die has at least two openings provided in the peripheral portion thereof.

3. A process as claimed in claim 1, wherein the total cross-sectional area of the openings of the first die is approximately the same as that of the openings of the second die.

* * * * *